United States Patent [19] [11] 3,862,046
Walker, Jr. et al. [45] *Jan. 21, 1975

[54] STRENGTHENED AND HIGH DENSITY BATIO$_3$

[75] Inventors: Basil E. Walker, Jr., Oxon Hill, Md.; J. Richard Spann, McKlean; Roy W. Rice, Alexandria, both of Va.

[73] Assignee: The United States of America as represented by the Secretary of the Navy, Washington, D.C.

[ * ] Notice: The portion of the term of this patent subsequent to Aug. 21, 1990, has been disclaimed.

[22] Filed: May 18, 1973

[21] Appl. No.: 361,710

[52] U.S. Cl.............. 252/62.9, 106/73.1, 106/73.2, 106/73.31
[51] Int. Cl............................................ C04b 35/46
[58] Field of Search............... 106/73.1, 73.2, 73.31; 252/62.9

[56] References Cited
UNITED STATES PATENTS
3,000,745   9/1961   Cianchi.............................. 106/73.1
3,753,911   8/1973   Walker.............................. 252/62.9

Primary Examiner—Jack Cooper
Attorney, Agent, or Firm—R. S. Sciascia; Arthur L. Branning

[57] ABSTRACT

The mechanical strength and densification of barium titanate ceramic bodies are enhanced by the addition of small amounts of halide salts in combination with metal oxides. Transparency of barium titanate bodies are also attained by the addition of an alkaline earth fluoride.

4 Claims, No Drawings

3,862,046

STRENGTHENED AND HIGH DENSITY BATIO

This invention is related to our copending application Ser. No. 156,493 filed June 24, 1971 now U.S. Pat. No. 3,753,911.

BACKGROUND OF THE INVENTION

1. Field of the Invention

This invention relates to ceramic materials and, more particularly, to barium titanate ceramics having improved strength and density properties. In our copending application Ser. No. 156,493, now U.S. Pat. No. 3,753,911 alkali metal halides were disclosed as additives to improve the mechanical strength of barium titanate ceramic bodies. The present invention relates to further additives for improving the mechanical strength of barium titanate ceramic bodies.

2. Description of the Prior Art

Barium titanate is a well known dielectric material commonly employed in a wide variety of applications in the electronics industry. Where the material is formed into piezoelectric ceramic bodies, its mechanical strength becomes of utmost importance. Previous attempts to provide strong barium titanate piezoelectric ceramic bodies, such as, for example, transducer rings, has resulted in impairment of the ferroelectric and dielectric properties of the ceramic body. Prior art additives, such as Ce, Ta, or Nb, diminish the dielectric strength whereas other materials such as Bi, Sb, or As that don't diminish the dielectric strength, cause manufacturing difficulties and lack of uniformity from batch to batch due to their high vapor pressure.

SUMMARY OF THE INVENTION

The present invention provides novel barium titanate-based ceramic bodies having improved densification and mechanical strength properties without impairment of ferroelectric and dielectric characteristics. The combination of at least about 0.1% halide salts of alkaline earth metals with at least about 0.5% MgO or $La_2O_3$ and the balance $BaTiO_3$, comprise the ingredients for the high strength ceramic bodies. Standard manufacturing techniques such as, for example, cold pressing, sintering and annealing or hot pressing plus annealing are suitable to produce the novel ceramic bodies for use as piezoelectric elements, capacitors, and electro-optical elements.

DESCRIPTION OF THE PREFERRED EMBODIMENTS

In accordance with the present invention an improved piezoelectric ceramic body, based on barium titanate, can be made with standard ceramic techniques having unexpectedly high mechanical strength if small amounts of a halide salt and a metal oxide are added to the ceramic mixture. By the phrase standard ceramic techniques it is meant that the barium titanate mixes may be cold pressed and then fired under various controlled environmental conditions and annealed or hot pressed with subsequent annealing.

Properties of barium titanate powders useful with the present invention are listed and compared in Table I. These powders, which are available commercially, were pressed and annealed into ceramic bodies and subsequently tested for mechanical strength on an Instron test machine. Density was determined by the buoyancy method and the approximate grain size and porosity were determined with optical and electron microscopy techniques. The above testing methods were also utilized on the ceramic bodies set forth in Tables II-V. As can be seen in Table I, Sample A had a 1.5% impurity level but also had the greatest strength. (This is likely the result of its small grain size.) The impurities present in the powders were primarily hydroxides and carbonates, however, their presence was of no effect since they substantially all disappeared during heat treatment of the test specimens.

Table I

| $BaTiO_3$ Sample Powders* | Wt. % Impurities | Wt.% Additives | Annealing Temp., °C | % Theoretical Density | Modulus of Rupture (R), psi | Ave Particle Size, $\mu$ |
| --- | --- | --- | --- | --- | --- | --- |
| A | 1.5 | 0 | 900 | 98.0 | 15,500 | 0.5 |
| B | 2.0 | 0 | 900 | 98.5 | 12,000 | 1.0 |
| C | 0.2% | 0 | 1300 | 99.0 | 11,500 | 1.0 |
| D | 0.3% | 0 | 1000 | 91.0 | 5,500 | 1-2.0 |

*Samples were hot pressed 10–50 min at 1000–5000 psi; at 900–1200°C and annealed for about 10 hours Table II illustrates the results obtainable when various single ingredients are added to the barium titanate mixes. Commercially manufactured barium titanate transducer rings containing calcium titanate as an additive were also tested and listed for comparison purposes. Table III is similar in that it shows the mechanical strength properties of multiple ingredients in combination with barium titanate.

Table II

| $BaTiO_3$ Sample Powders* | Wt. % Impurities | Wt. % Additives | Annealing Temp., °C | % Theoretical Density | Modulus of Rupture (R), psi | Ave Particle Size, $\mu$ |
| --- | --- | --- | --- | --- | --- | --- |
| No. 1** | 2–4.0 | 5% $CaTiO_3$ | — | 95 | 16,000 | 8 |
| No. 2** | 2–4.0 | 5% $CaTiO_3$ | — | 94 | 16,000 | 2 |
| No. 3** | 2–4.0 | 5% $CaTiO_3$ | — | 95 | 14,000 | 2 |
| A | — | 2% LiF | 1000 | 98 | 15,000 | — |
| A | — | 2% MgO | 1300 | 95 | 7,000 | 6 |
| A | — | 1% $MgF_2$ | 1000 | 95.5 | 9,000 | 3 |
| A | — | 2% ZnO | 1100 | 99 | 17,000 | — |
| B | — | 2% LiF | 900 | 95.5 | 8,500 | — |
| D | — | 2% LiF | 1100 | 97.5 | 14,500 | — |

*Samples were hot pressed 10–50 min at 1000–5000 psi; at 900–1200°C and annealed for about 20 hours.
**Commercial $BaTiO_3$ Transducer Ring Test Samples.

Table III

| BaTiO₃ Sample Powders | Wt. % Additives | Annealing Temp., °C | % Theoretical Density | Modulus of Rupture (R), psi | Ave Particle Size, μ |
| --- | --- | --- | --- | --- | --- |
| A | 5% CaTiO₃ 0.5% CoCO₃ | 1400 | 92.5 | 9000 | 3 |
| A | 0.5% LiF 1.0% Ta₂O₅ | 1000 | 98.0 | 17,000 | 3 |
| A | 1.0% LiF 1.0% MgF₂ | 1100 | 97.0 | 13,000 | 6 |
| A | 1.0% LiF 1.0% Al₂O₃ | 1000 | 90.0 | 10,000 | 1 |
| A | 5.0% CaTiO₃ 0.5% CaTiO₃ | 1300 | 95.0 | 14,500 | 1 |

Table IV exemplifies the present invention and demonstrates the unexpected improvement in mechanical strength of hot pressed barium titanate ceramics by the addition of varying amounts of alkaline earth metal halides in combination with magnesium oxide. At least 0.1% of a halide salt in combination with magnesium oxide significantly improves the mechanical strength of the barium titanate-based ceramic bodies. La₂O₃ can be used in place of the MgO. Additionally although only two additives are shown in combination with the BaTiO₃, various combinations of three or more of the additives can be utilized. The samples were hot pressed at 1,000°C and annealed for 20 hours at the temperature indicated. The optimum annealing temperature was between 1,000° and 1,200°C.

Other prior art additives may be used with the halide salt-metal oxide combination to effect specific purposes. Illustrative of such additives is magnesium titanate, cobalt titanate, calcium titanate, aluminum oxide, tantalum oxide, and the like. The ceramic bodies of the present invention may also be cold pressed and then sintered at about 1,000°C for 1–2 hours under an air, vacuum, or hydrogen environment and then annealed (as in the hot pressing operation). The best results occur when the cold pressed bodies are sintered under reducing conditions, such as a vacuum or hydrogen atmosphere, prior to annealing.

The dielectric properties of various barium titanate-based ceramics of the present invention are listed in Table V and compared to typical commercial samples.

Table IV

| Wt. % Additives | Annealing Temp., °C | % Theoretical Density | Avg. Modulus of Rupture (R), psi | Range of M.O.R. | Avg. Grain Size |
| --- | --- | --- | --- | --- | --- |
| No add | RT | 98.1 | 11,000 | 10,000–12,500 | 1 |
|  | 900 | 97.9 | 15,000 | 14,500–15,500 | 5 |
|  | 1200 | 98.1 | 13,000 | 10,000–14,500 | 15 |
| 1 BaF₂ + 2 MgO | RT | 98.2 | 27,000 | 26,000–29,000 | 2 |
|  | 1000 | 99.3 | 22,000 | 19,000–25,500 | 3 |
|  | 1100 | 98.9 | 22,500 | 21,000–29,000 | 3 |
|  | 1200 | 98.6 | 25,000 | 21,000–27,500 | 5 |
|  | 1300 | 99.0 | 25,500 | 21,000–28,000 | 5 |
| 1 CaF₂ + 2 MgO | RT | 99.1 | 16,000 | 14,000–18,500 | 2 |
|  | 1100 | 97.9 | 11,000 | 10,000–12,000 | 3 |
|  | 1200 | 98.0 | 22,000 | 21,500–22,500 | 5 |
| 1 SrCl₂ + 2 MgO | RT | 94.5 | 6,500 | 6,000–7,000 | 2 |
|  | 1100 | 95.2 | 14,000 | 12,000–16,000 | 3 |
|  | 1200 | 96.1 | 20,000 | 19,500–20,500 | 5 |
| 2 MgF₂ | RT | 95.2 | 9,000 | 7,500–10,000 | 1 |
|  | 1000 | 95.6 | 9,000 | 8,000–10,000 | 5 |
|  | 1200 | 94.2 | 8,000 | 6,000–9,000 | 20 |
| 2 MgO | RT | 93.0 | 4,000 | 3,500–4,500 | 1 |
|  | 1000 | 93.6 | 4,500 | 3,500–5,500 | 5 |
|  | 1200 | 93.6 | 5,000 | 4,500–5,500 | 8 |
| 1 BaF₂ | RT | 99.4 | 16,000 | 15,000–20,000 | 1 |
|  | 800 | 98.9 | 16,500 | 15,000–18,000 | 2 |
|  | 900 | 98.9 | 15,000 | 14,000–15,500 | 3 |
|  | 1000 | 96.4 | 9,000 | 8,000–10,000 | 3 |

Table V

| Wt. % Additives | Annealing Temp., °C | % Theoretical Density | Avg. M.O.R. | Avg. Grain Size | Dielectric Constant | % Loss Factor |
| --- | --- | --- | --- | --- | --- | --- |
| 1 BaF₂ + 2 MgO | 1200 | 98.6 | 25,000 | 5 | 1400 | 0.6 |
| 1 CaF₂ + 2 MgO | 1200 | 98.0 | 22,000 | 5 | 1400 | 1.2 |
| 1 SrCl₂ − 2 MgO | 1200 | 96.1 | 20,000 | 5 | 1500 | 0.5 |
| No add | 900 | 97.9 | 15,000 | 5 | 2000 | 3.0 |
| 2 MgF₂ | 1000 | 95.6 | 9,000 | 5 | 1400 | 4.0 |
| 2 MgO | 1200 | 93.6 | 5,000 | 8 | 2200 | 5.1 |
| 1 BaF₂ | 800 | 98.9 | 16,500 | 3 | 6400 | 2.1 |
| Commercial No.1 | — | 95.0 | 16,000 | 8 | 2000 | 1.0 |
| No.2 | — | 94.0 | 15,000 | 2 | 2000 | 1.0 |
| No.3 | — | 95.0 | 14,000 | 2 | 2000 | 1.0 |

As shown, the loss factors and dielectric constants of the high strength materials compare favorably with the prior art.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A barium titanate piezoelectric ceramic body consisting of:

at least about 0.1% by weight of an alkaline earth metal halide selected from the group consisting of $BaF_2$, $CaF_2$ and $SrCl_2$;

at least about 0.5% by weight MgO or $La_2O_3$; and the balance $BaTiO_3$, said ceramic body exhibiting a higher average modulus of rupture than a $BaTiO_3$ ceramic body without said metal halide and MgO or $La_2O_3$.

2. The ceramic body of claim 1 wherein said metal halide is $BaF_2$.

3. The ceramic body of claim 1 wherein said metal halide is $CaF_2$.

4. The ceramic body of claim 1 wherein said metal halide is $SrCl_2$.

* * * * *